(12) United States Patent
Hess et al.

(10) Patent No.: US 6,769,155 B2
(45) Date of Patent: Aug. 3, 2004

(54) TENSIONING AND RELAXING ELEMENT

(75) Inventors: Ruedi Hess, Tegerfelden (CH); Erwin Rott, Rüti (CH)

(73) Assignee: Mammut TEC AG, Seon (CH)

( * ) Notice: Subject to any disclaimer, the term of this patent is extended or adjusted under 35 U.S.C. 154(b) by 0 days.

(21) Appl. No.: 10/344,934

(22) PCT Filed: Aug. 15, 2001

(86) PCT No.: PCT/CH01/00500
§ 371 (c)(1),
(2), (4) Date: Jun. 2, 2003

(87) PCT Pub. No.: WO02/14105
PCT Pub. Date: Feb. 21, 2002

(65) Prior Publication Data
US 2004/0108497 A1 Jun. 10, 2004

(30) Foreign Application Priority Data
Aug. 18, 2000 (CH) .............................................. 1609/00

(51) Int. Cl.$^7$ ........................ A44B 21/00; B25B 25/00; F16G 11/12
(52) U.S. Cl. ................. 24/68 SK; 24/68 R; 24/68 CD; 24/71 SK; 24/909; 192/41 S; 192/43; 254/51; 254/164; 254/217
(58) Field of Search .......................... 24/68 SK, 68 R, 24/68 CD, 71.1, 70 SK, 69 SK, 265 L, 909; 192/41 S, 43; 254/51, 164, 217

(56) References Cited

U.S. PATENT DOCUMENTS

| | | | | |
|---|---|---|---|---|
| 2,883,022 A | * | 4/1959 | Clausing et al. | ........... 192/41 R |
| 3,718,315 A | * | 2/1973 | Huber | .......................... 24/68 B |
| 3,749,366 A | * | 7/1973 | Brucker | .................... 24/68 CD |
| 4,542,883 A | * | 9/1985 | Rutzki | ......................... 254/217 |
| 4,584,742 A | * | 4/1986 | Speich | ..................... 24/68 CD |
| 4,657,125 A | | 4/1987 | Heesch | |
| 4,823,443 A | * | 4/1989 | Waters | ..................... 24/68 CD |
| 5,692,269 A | | 12/1997 | Kamper | |
| 6,047,451 A | * | 4/2000 | Berger et al. | .................. 24/909 |
| 6,195,848 B1 | * | 3/2001 | Jackson et al. | .......... 24/68 CD |

FOREIGN PATENT DOCUMENTS

| | | |
|---|---|---|
| DE | 178 078 C | 10/1905 |
| EP | 0 331 490 A2 | 9/1989 |
| EP | 0 455 085 B1 | 4/1992 |
| EP | 0 736 698 B1 | 12/1997 |

OTHER PUBLICATIONS

EPO Search Report dated Dec. 14, 2001.

* cited by examiner

Primary Examiner—Victor Sakran
(74) Attorney, Agent, or Firm—Burns, Doane, Swecker & Mathis, L.L.P.

(57) ABSTRACT

The invention relates to a tensioning/relaxing element that comprises a base (3), at least one rotating shaft (4) mounted on said base, a mobile part (2) and a lashing device (1). Between said base (3) and the at least one shaft (4) at least one nonpositive and positive element (5, 6) is provided that tightly encloses the shaft (4). The first nonpositive and positive element (5), configured as a tensioning element, is firmly linked on the one side (5a) with a part (2) that is mobile vis-a-vis the base (3) and can be actuated on the other side (5b), with a variable and continuous pretension, via a first actuator (11), while the second nonpositive and positive element (6), configured as a relaxing element, is firmly linked on the one side (6a) with the base (3) and can be actuated on the other side (6b), with a variable and continuous pretension, via a second actuator (11'). The invention is characterized in that the tension force or relaxing force can be continuously modified during the tensioning or relaxing process.

18 Claims, 5 Drawing Sheets

TENSIONING AND RELAXING ELEMENT

BACKGROUND OF THE INVENTION

Known tensioning and relaxing elements are, in many instances, used in tension ratchets. According to the European patent application EP-A1-0455085, a tension ratchet is known that permits the gradual release of a safety lock that prevents backward rotation by means of moving a tension lever to and fro.

In the known tension ratchets, both locking slides of the safety lock that prevents backward rotation are arranged one atop the other, next to the roll-up shaft on the base of the tension ratchet. In order to reduce the structural height of the ratchet, embodying the lock's locking sides in a curved fashion is known, furthermore.

According to European patent application EP-A-1-0736698, it is known how to embody tension ratchets so that both locking slides are arranged so as to lie diametrically opposed to each other in relation to the locking wheel, and so that the locking slides' direction of shift is essentially congruent with the mean longitudinal direction of the ratchet's base.

The disadvantage to these tensioning/relaxing elements is that they all work according to the principle of engaging the slides in positive toothed, perforated gear wheels. For this reason, such tensioning/relaxing elements can be moved only in stages (tooth-hole size distance). The tensioning, and especially, the relaxation, generally occurs with a jerky lever motion by means of being moved to and fro. These jerky movements in the process of relaxation are associated with high mechanical stresses for the locking wheel.

SUMMARY OF THE INVENTION

It is the task of the invention to describe tensioning and relaxing elements in which the tensioning or relaxation occur continuously and variably.

According to the invention, this task is accomplished with tensioning and relaxing elements according to the wording of patent claim 1.

BRIEF DESCRIPTION OF THE DRAWINGS

In what follows, the invention is more closely elucidated by virtue of the drawings.

DETAILED DESCRIPTION OF THE INVENTION

Figure 1A:
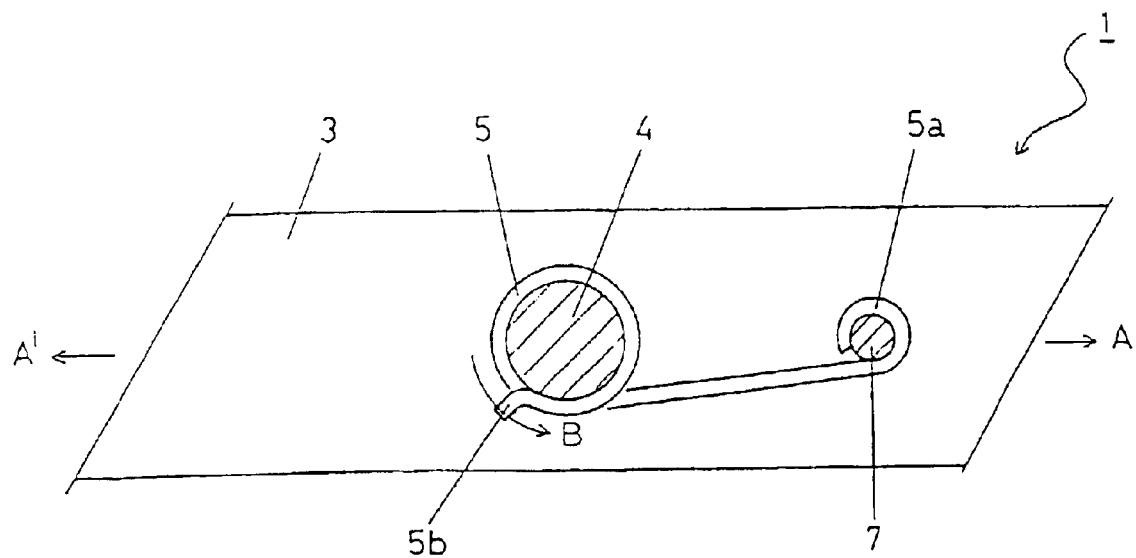
FIG. 1A shows a schematic representation of a relaxing element, viewed from above.
Figure 1B:
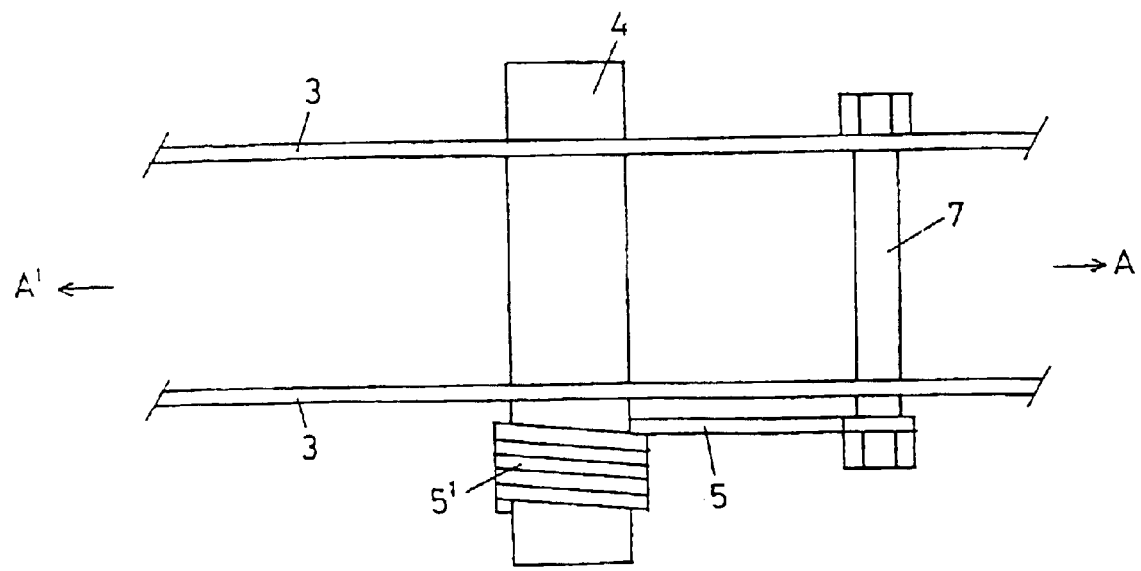
FIG. 1B shows a lateral view of FIG. 1A.

FIGS. 1A and 1B show, schematically, a relaxing element according to the invention in a view from above and a lateral view, respectively A base 3 exhibits a shaft 4 that is seated in it on a bearing, on which a first end of a lashing device may be wound up for direction of draw A or transported in a non-positive manner, while the other, second end of the lashing device is attached to base 3 itself (not shown) for direction of draw A'.

On the shaft 4, a relaxing element 5 is found, which is embodied as a spring with at least one spring winding 5'. One end 5a of the spring is attached to a second shaft 7, which is found on the base 3, whereas the other end of the spring 5b is present, bent around, perpendicular to the tangent of spring winding 5'. The end 5b is provided for the purpose of accepting the actuators of the relaxing element, which can be present in the form of a rotating knob or a tipping lever, for example.

Spring 5, which lies close upon shaft 4, is dimensioned in such a manner that it blocks the latter, which, in the case of a given tension force, is given as a result of the number of spring windings 5' that are chosen, as a result of their seat-engaging surface on the shaft, as a result of the cross-section of the windings, and the material properties of the spring's material. On the other hand, in the case of a greater prescribed tension, the arrangement of the spring is not limited to a single spring. A particularly advantageous embodiment form exhibits, on shaft 4, for example, two relaxing elements 5, which are arranged symmetrically, relative to a plane that runs perpendicular through the shaft. Thus, both elements function as image and mirror image.

In the taut state, the lashing device is present in the directions of draw A–A' with a tension that is blocked by the spring 5, which is based upon the well-known rope friction principle, in which the friction coefficients of the shaft and the spring's seat engaging surface are determinant.

In order to achieve high friction, the spring winding exhibits, to good advantage, a square or rectangular cross-section. It is essential that at least the spring winding's seat-engaging surface exhibit as flat a surface as possible for establishing contact with shaft 4.

Now, if the spring 5 is successively released by way of an actuator in the direction of arrow B, the lashing device can be continuously and variably relaxed.

The embodiment form of this relaxing element, which can be released continuously, is sparing of materials and simple to produce, which is advantageous.

Such a relaxing element can be applied to every ratchet or similar device that is known today. For new structural forms of bases, ratchets and shafts or winding and unwinding elements in or next to the base, or on either side of existing locking wheels, it can be relocated onto the winding axes, or be seated on bearings on a separate axis.

Figure 2A:
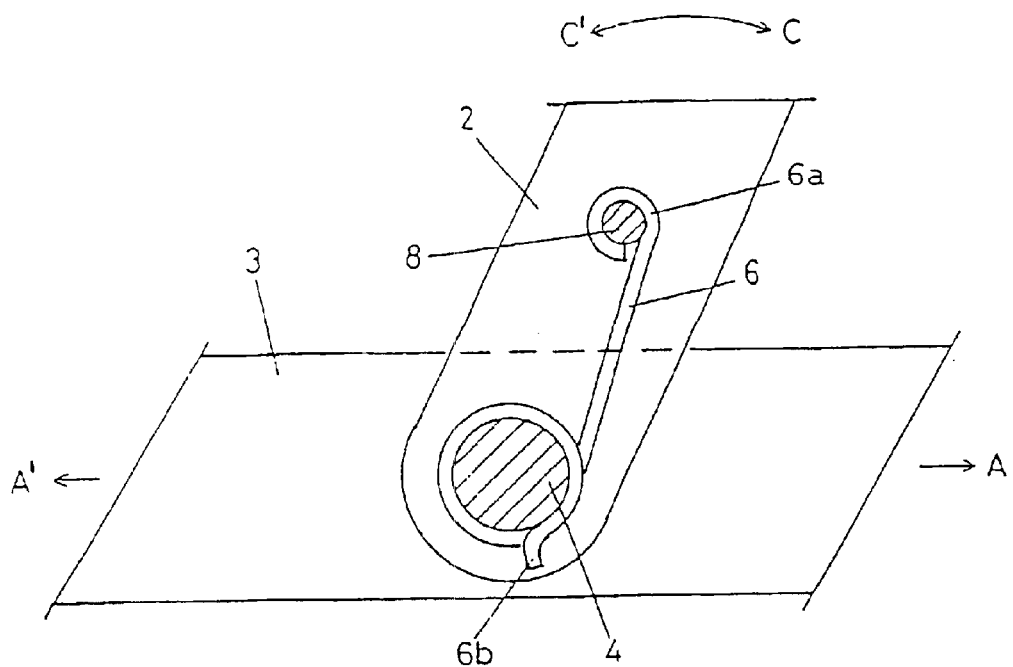
FIG. 2A shows a schematic representation of a tensioning element, viewed from above.
Figure 2B:
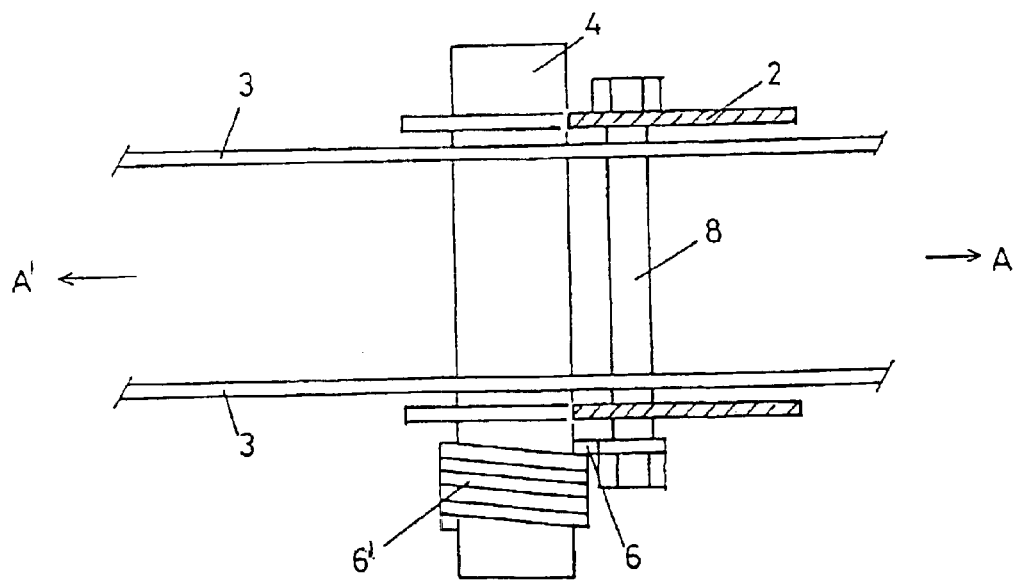
FIG. 2B shows a lateral view of FIG. 2A.

FIGS. 2A and 2B show, schematically, a tensioning element according to the invention, in a view from above and in lateral view, respectively.

A base 3 exhibits a shaft 4 that is seated on a bearing in it, on which a first end of a lashing device may be wound up or is capable of being transported in a non-positive manner for the direction of draw A, whereas the other, second end of the lashing device for the direction of draw (A'), is attached at the base plate 3 itself (not shown). The tensioning element 6, which is embodied as a spring with at least one spring winding 6', is found on shaft 4. One end, 6a of the spring, is attached to a third shaft 8, on part 2, which is seated on a bearing so that it can move, and also seated on shaft 4, whereas the other end, 6b of the spring, is present, bent around, perpendicular to the tangent of spring winding 6'. End 6b is provided for the purpose of accepting the actuators of the tension element, which can be present, for example, in the form of a rotating knob or a tipping lever. Spring 6, which lies close to shaft 4, is dimensioned in such a way that it blocks the latter, which is given, in the case of a given tension force, as a result of the number of spring windings 6' that are selected, as well as their seat-engaging surface on the shaft. On the other hand, in the case of greater prescribed tension, the arrangement of the spring is not limited to one single spring. A particularly advantageous embodiment form exhibits two tensioning elements 6, which are arranged symmetrically, on shaft 4, for example.

In the relaxed state, the lashing device is present, oriented in the directions of draw A–A', in a loose form. Spring 6 blocks shaft 4, which again is based upon the well-known rope friction principle.

Now, if the movable pan 2 is moved in the direction of arrow C', the lashing device is stretched if the latter is conducted on the upper side of the shaft. As a result of this motion, the spring closes, that is, the windings of the spring 'block' the shaft 4. Movement in the direction of arrow C causes the release of the spring, so that with the movable part 2, hauling can begin for the next tensioning process.

In this way, the similarity between the tensioning and relaxing element can be recognized. Essentially identical in the mode of their construction, both elements are distinct in their function in that the ends of the springs in one case, 5a and 6a, respectively, are attached at different points, namely on base 3 in the case of relaxing element 5 and on movable part 2 in the case of tensioning element 6.

Once again, the embodiment form of this tensioning element, which may be operated continuously, a form which is sparing of materials and simple to produce, is advantageous. A tensioning element of this type can be applied to every ratchet or similar device known today.

Common spring steels, aluminum, aluminum alloys, but also composite materials, such as carbon fiber laminates (CFL's), can be used for the springs. With regard to the fiber windings, these are high-performance textile fibers, steel fibers, ropes twisted out of the latter, aramide and the like.

Figure 3:
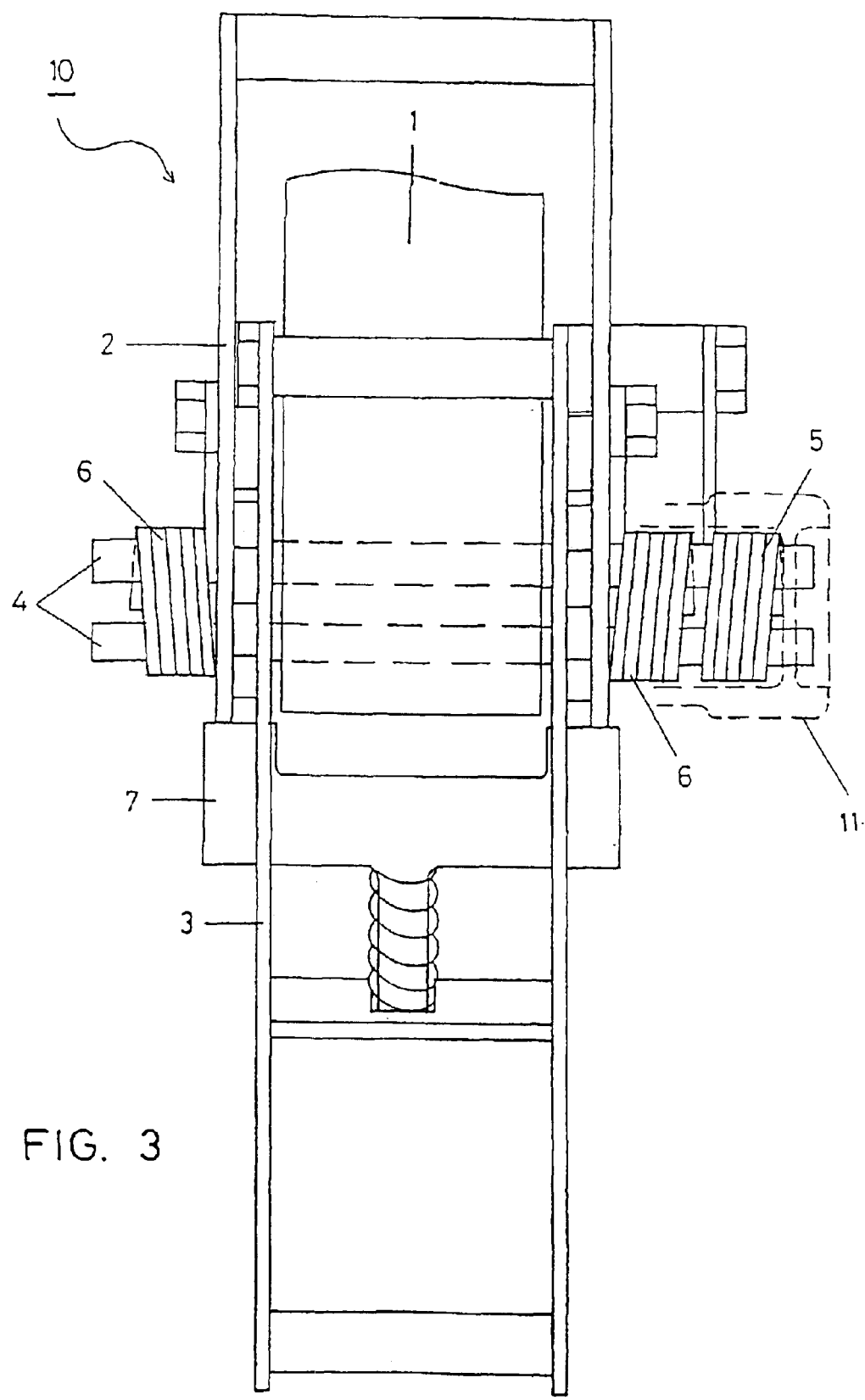
FIG. 3 shows a combination of tensioning and relaxing elements in a tension ratchet, viewed from above.

FIG. 3 shows a combination of the relaxing and tensioning elements, 5, 6, according to the invention, built up and built onto a known ratchet 10. A lashing line 1 is seated on a bearing on shaft 4 through the well-known form of roll-up or unrolling mechanism in a base 3. The shaft 4 exhibits a slit 4' for the acceptance of lashing line 1, which here constitutes the lashing device.

Two tightening elements 6, which are arranged here symmetrically in relation to the central plane of ratchet 10, are found on shaft 4. Movable part 2 is embodied as a tension lever. A securing lock 7 of the customary type is attached to base 3. A relaxing element 5, which exhibits a rotating knob 11 as the actuating element of relaxing element 5 is attached on one side of shaft 4. With this combination of relaxing and tensioning elements 5, 6, the lashing device can be wound up or unwound continuously. After continuous winding up with tensioning element 6, the winding and unwinding mechanism is secured or locked by means of a safety lock 7. For unwinding, the safety lock is unlocked and the lashing line 1 is unwound continuously or relaxed using relaxing element 5.

By these means, an embodiment of the continuously working tensioning/relaxing elements 5, 6 that is sparing of material and simple to produce, results, with which the lashing line may be subjected to tension or relaxed, simply and efficiently. The tensioning/relaxing elements can be used as a supplement to the well-known toothed gear wheels and rods, or as individual elements for the continuous tensioning of the lash line.

In lieu of a spring, a coil made of fibers, which consists of at least one winding of fibers, can be used. In the process, once again, the rope friction principle is used, in which the friction coefficients of the shaft and the seat-engaging surface of the fiber coil are determinant.

However, tensioning and relaxing elements 5, 6 can also be used with new forms of bases and winding and unwinding constructions. Therefore, in some instances, they can be applied as a supplement in a space-saving and lightweight manner, or be used as integrating elements. The winding and unwinding elements, which rest upon various bases, as well as the well-known ratchets, equipped with the tensioning/relaxing elements, are, as a result of the favorable structure of the tensioning/relaxing elements, lightweight and space saving, and very easy to use.

The invention will be elucidated further by virtue of the various embodiment examples.

Figure 4:
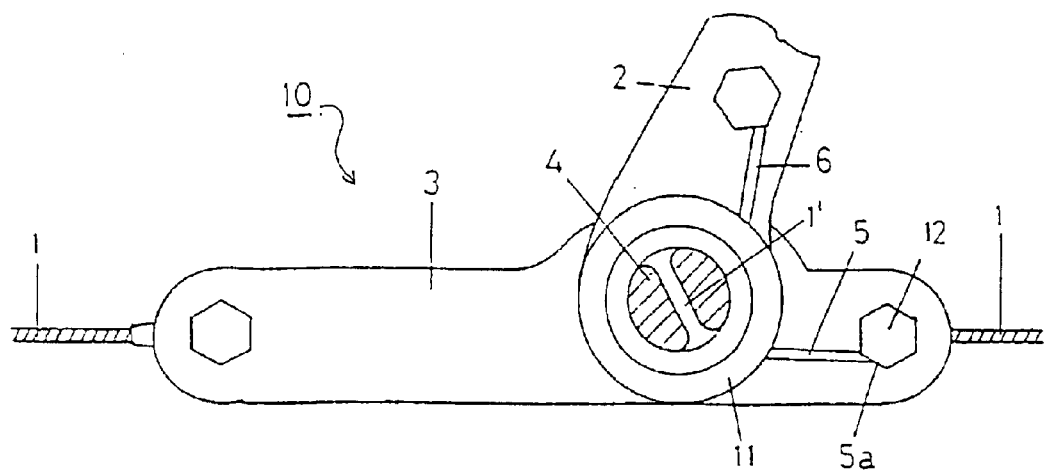
FIG. 4 shows a first embodiment example for the use of tensioning and relaxing elements in a ratchet.

FIG. 4 shows an initial embodiment example for the use of tensioning and relaxing elements in a ratchet.

In a ratchet 10 (Type 4000/5000), the base 3, the movable part 2, the lashing line 1, and shaft 4, which correspond to FIG. 3, are recognizable. After the length of the shaft and the length of one of the well-known ratchet's screws were altered, the tensioning and relaxing elements, 5,6, were mounted onto shaft 4, by mounting the tensioning element 6 on movable part 2, adjacent to the tension lever, whereas the relaxing element 5 was mounted on shaft 4, lying on the outside, by means of capping nut 12, with one end on the extended screw. One end, 1', of the lashing line was laid around the shaft 4, which is embodied here as an uptake and feed-out shaft. The other end of the lashing line is attached at base 3 in the well-known manner. Here, the relaxing element 5 is equipped with a rotating knob 11 for the actuation of the relaxation process, which, after the release of the security latch by depressing it or turning it, causes a continuous relaxation of the lashing line 1 with little expenditure of energy.

The result of this is a favorable construction of the tensioning/relaxing elements that is simple to construct and technologically favorable as a result of its application, as additional elements to well-known tension ratchet bases. On the one hand, the fixed end of the lashing line can be easily affixed to the shaft and on the other hand, the uptake shaft 4 and other parts can be extended easily, so that the tensioning/relaxing elements can be easily mounted to the base, or to the movable part respectively.

In addition, the similar construction of these elements is advantageous, since the few parts can be built as identical parts, which exerts a favorable influence on the production costs.

Figure 5:
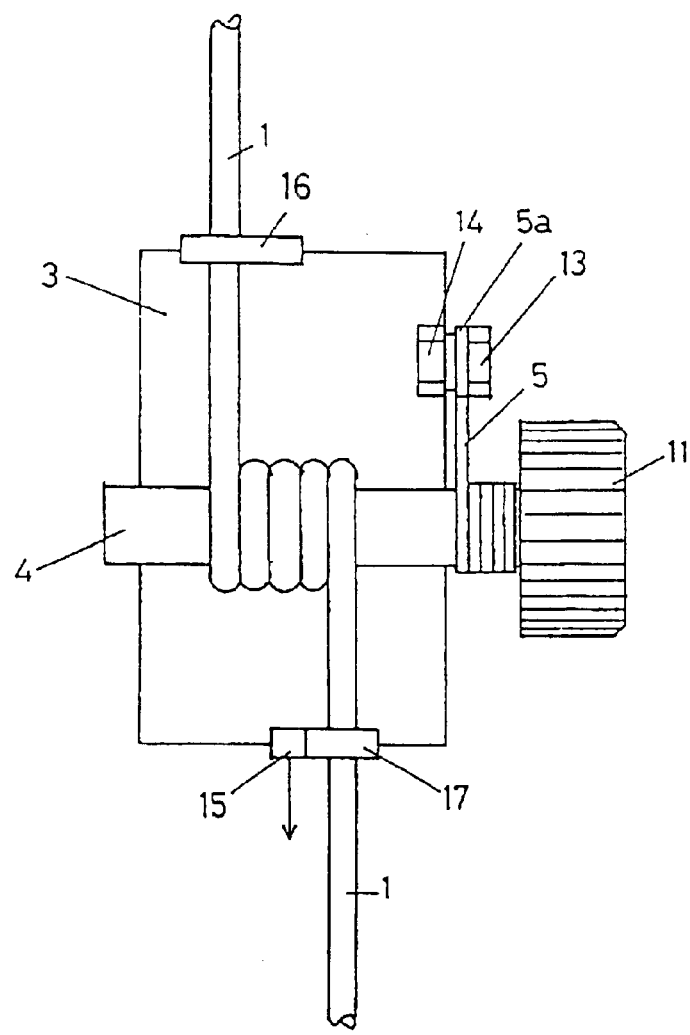
FIG. 5 shows an embodiment example of a relaxing element in a rappelling or load-lowering device.

FIG. 5 shows an embodiment example of a relaxing element in a rappelling or load-lowering device.

A shaft 4 is found seated on a bearing in a base 3, which is simultaneously embodied as a housing. At one end of shaft 4, the latter exhibits a relaxing element 5, which is embodied as a spring, with one end 5a attached to the housing 3 by means of screw 13 and nut 14. A knurled rotating knob, 11 serves as the actuator. The load is applied at point 15 of the housing by means of a common hook, which is indicated by an arrow. A rope 1 is conducted through an upper opening 16 into the housing, it loops around shaft 4 four or five times and leaves the housing through a lower opening 17. Bands made of plastic, metal, textile fibers, or similar materials, such as aramide or carbon may be used as rope 1. The device permits a continuous and controllable lowering of a load in conjunction with a simple maneuver, this practically independent of surrounding conditions such as moisture, water, oil, dryness, and heat. The lowering takes place by means of a rotating knob or a similar element, with little expenditure of energy. In the case of panic or release of the knob, the relaxing element immediately effects a standstill of the load that is to be lowered, which is very advantageous from the perspective of safety technology.

Obviously, the device can be equipped, in addition, with a tensioning element, such that the elevating force is built up by means of a lever, wheel, or a similar element (not shown). If necessary, locking occurs in a positive fashion. The construction is characterized by a flat mode of construction comprising few structural parts, which is low-weight, capable of continuous regulation, and user-friendly.

Figure 6:
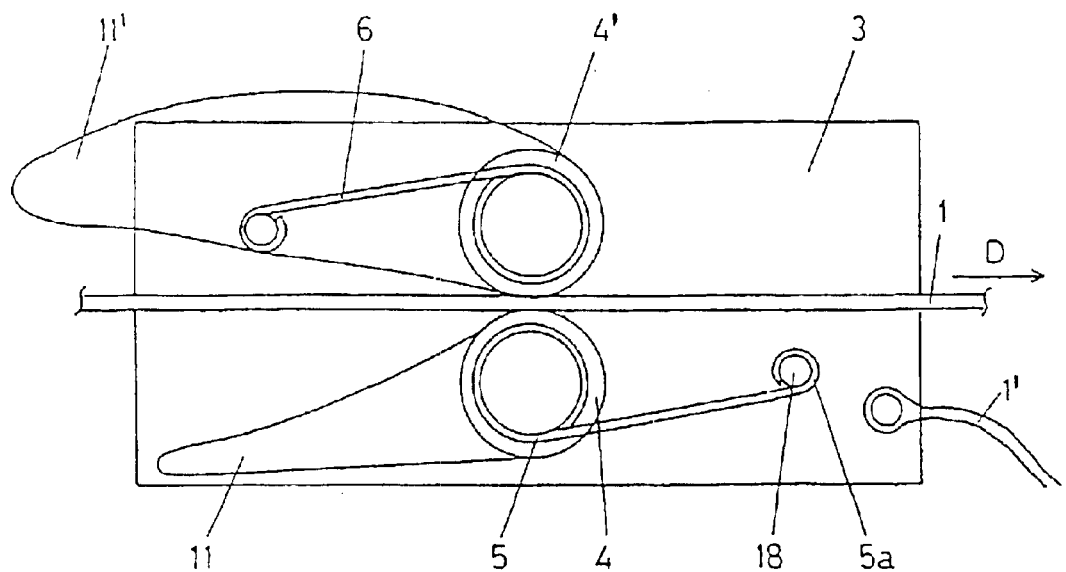
FIG. 6 shows a tensioning and relaxing element in orthopedics.

FIG. 6 shows an embodiment example of a tensioning and relaxing element in orthopedics, represented in cross-section.

In the field of orthopedics and rehabilitation medicine, splints with bandages that are secured with klett closures are often used. Thus, for example, in the case of knee splints, the upper half, the upper half of the supporting device is attached to the thigh. Due to muscular atrophy, or as a result of the muscles' working, a readjustment or tightening of the bandage becomes frequently necessary to assure uniform and constant support. Although this is easy to achieve with a klett closure, the latter, as a rule, lacks any reference marking. Thus, it is difficult to impossible to attach or to close this closure at the same point again after opening. This leads to a recurring disadvantage in terms of wearing comfort.

In a base 3, seated on a bearing, a first shaft 4 is found, with a relaxation element 5 in the form of a spring, one end of which, 5a, is attached to base 3 by means of a screw, 18. An actuator, encompassing and covering over the relaxing element 5, in the form of a lever 11, which, by virtue of its shape, provides no opportunities for further injury, is applied to the shaft. The lashing device, here embodied as lashing strip 1, is led over the shaft 4, lies upon it and is subjected opposing pressure, due to a second shaft 4', which is seated on bearings above the first shaft 4 in base 3. Lashing strip 1' is attached to base 3 and forms the opposite member. An arrow, D, indicates the direction of the tension. The lashing strip is no longer wrapped up onto the shaft 4, but merely led by on top of it. For this purpose, shaft 4 is embodied in roughened or rippled fashion, and the lashing strip can be furnished with a plastic coating in order to achieve greater friction values. A tensioning element 6, also embodied as a spring, and with an actuating lever 11' that covers the base, is found on shaft 4'. This permits improved safety of use by means of continuous, simple, and reproducible maneuvering. The continuous relaxation by means of tipping lever 11 is possible with little energy expenditure. The tension is built up continuously by means of actuating lever 11'. The construction is distinguished by a flat structural style that comprises few structural parts, is low-weight, as well as by a continuous, user-friendly embodiment.

Figure 7:
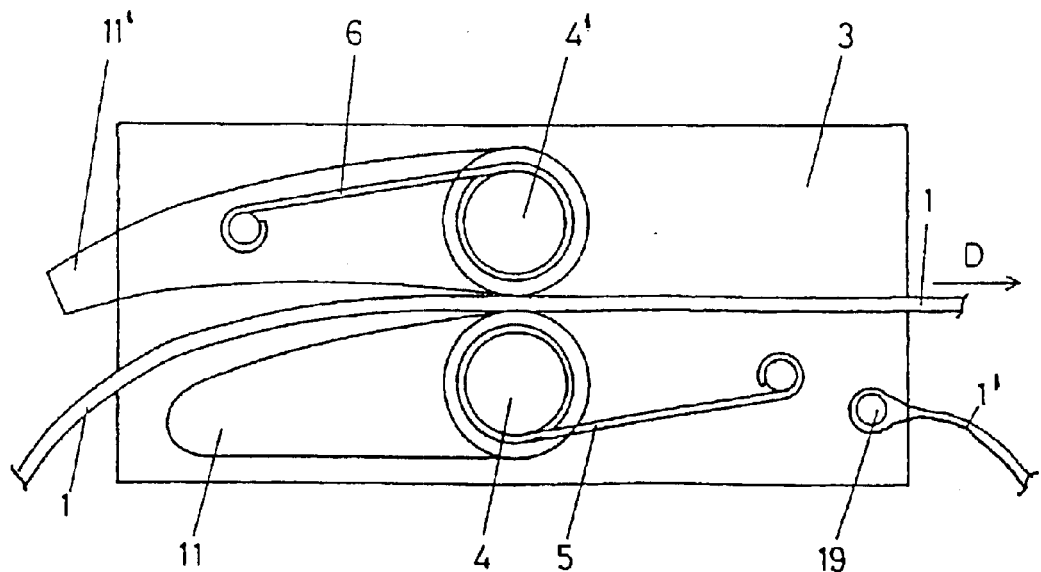
FIG. 7 shows an embodiment example of a tensioning and relaxing element in bindings for skis and snowboards.

FIG. 7 shows an embodiment example of a tensioning and relaxing element in bindings for skis and snowboards.

The arrangement shown corresponds, substantially, to the one described in FIG. 6, with two shafts, 4 and 4'. The base 3, the tensioning and relaxing elements 6, 5, and the actuating elements, 11 and 11' are recognizable, furthermore. The lashing strip leads from a first attachment on the snowboard, coming through between the shafts 4, 4' in the direction of tension indicated by arrow D, whereas the other lashing strip 1', coming from a second attachment point on the snowboard, is attached at the base, at the point 19. The tension is built up continuously by means of lever 11'. The continuous relaxation occurs by means of tipping lever 11, with little expenditure of energy.

In this way, the increase or decrease of tension on a drawing element mounted on an element such as shoes, ski shoes, snowboard shoes, snowboard binding, roller blade shoes, is used for continuous tensioning or relaxing. The construction renders a flat mode of construction possible, comprises few structural parts, and is therefore light and user-friendly.

A further embodiment example of a tensioning and relaxing element is found in water sports, especially sailing and surfing.

There, tensioning and relaxing elements are used to increase or decrease the tension of a drawing element, such as ropes, mounted on a ship's deck, a ship's shell, a rope, a sail, etc. for the purpose of continuous tensioning or relaxing.

The combination of a tensioning element 6 for the continuous tightening or winding up of a winding-up or unwinding element, for building up the tension of a lashing line, leads to the improvement of safety in use by means of continuous, simple maneuvering.

What is claimed is:

1. Tensioning/relaxing elements for a tensioning/relaxing device that comprises a base, at least one shaft seated on the base on a bearing and capable of rotation, a moveable part, and a lashing device, wherein between the base and the one shaft, at least, at least one non-positive and positive element is provided, which closely surrounds the shaft, wherein the first non-positive and positive element, as a tensioning element, is, on one side firmly connected with a part that may be moved relative to base, and, on the other side, may be actuated with a variable and continuous pre-stress by means of a first actuating element and wherein the second non-positive and positive element is firmly connected, on one side with the base, and, on the other side, with a variable and continuous pre-stress by way of a second actuator, such that the tensioning or relaxing force in the tensioning process or relaxing process, respectively, can be changed continuously.

2. A tensioning/relaxing element according to claim 1, wherein the non-positive and positive element is embodied as a spring that consists of at least one spring winding.

3. A tensioning/relaxing element according to claim 1, wherein the non-positive and positive element is embodied as a fiber coil that consists of at least one fiber winding.

4. A tensioning/relaxing element according to claim 1, wherein the non-positive and positive elements are, in each case arranged symmetrically to each other.

5. A tensioning/relaxing element according to claim 1, wherein the non-positive and positive elements are embodied as identical parts and are, therefore, interchangeable.

6. A tensioning/relaxing element according to claim 2, wherein the spring, at one end exhibits an annular formation or eye, respectively, and the other end is bent perpendicular to the tangent of the spring winding and is provided for the purpose of accepting an actuator.

7. A tensioning/relaxing element according to claim 6, wherein the spring exhibits, a substantially square or rectangular cross-section.

8. A relaxing element according to claim 1, wherein a tipping lever or rotating knob is provided as the first actuator, with which the continuous relaxation occurs with the expenditure of little energy.

9. A tensioning element according to claim 1, wherein a moveable part, with which the continuous tension occurs with little expenditure of energy, is provided as an actuator for the tensioning element.

10. The use of the tensioning/relaxing element according to claim 1 in a rappelling or load-lowering device.

11. The use of the tensioning/relaxing element according to claim 1 in a tension ratchet.

12. A tension ratchet according to claim 1, comprising a base, at least one shaft, a winding-up and unwinding mechanism, a moveable part and a lashing line, wherein at least one tensioning element and one relaxing element each is provided.

13. A tension ratchet according to claim 12, wherein in order to secure against the reverse rotation of the shaft, a substantially separate, positive element is provided as a safety lock in the taut state.

14. A tensioning device according to claim 1, comprising a base, two shafts, a moveable part, and a lashing device, wherein the two shafts are arranged around the lashing device in such a manner that the latter stands in close contact with both shafts and goes past them, wherein at least one relaxing element, for which a first actuator is provided for its actuation, is applied to the first shaft, and wherein to the second shaft at least one tensioning element, for which a second actuator is provided for its actuation, is applied.

15. The use of the tensioning/relaxing element according to claim 14 in orthopedics and rehabilitation.

16. The use of the tensioning/relaxing element according to claim 14 in bindings for skis and snowboards.

17. The use of the tensioning/relaxing element according to claim 14 in sports shoes.

18. The use of the tensioning/relaxing element according to claim 14 in water sports.

* * * * *